US010259730B2

(12) United States Patent
Ball et al.

(10) Patent No.: US 10,259,730 B2
(45) Date of Patent: Apr. 16, 2019

(54) SOIL AND WATER REMEDIATION METHOD AND APPARATUS FOR TREATMENT OF RECALCITRANT HALOGENATED SUBSTANCES

(71) Applicant: Oxytec LLC, Newton, MA (US)

(72) Inventors: Raymond G. Ball, Newton, MA (US); Alan T. Moore, Somerville, MA (US)

(73) Assignee: OxyTec LLC, Newton, MA (US)

( * ) Notice: Subject to any disclaimer, the term of this patent is extended or adjusted under 35 U.S.C. 154(b) by 0 days.

(21) Appl. No.: 16/039,837

(22) Filed: Jul. 19, 2018

(65) Prior Publication Data

US 2018/0319685 A1    Nov. 8, 2018

Related U.S. Application Data

(63) Continuation of application No. PCT/US2017/013433, filed on Jan. 13, 2017.
(Continued)

(51) Int. Cl.
*B09C 1/08* (2006.01)
*C02F 1/02* (2006.01)
(Continued)

(52) U.S. Cl.
CPC .............. *C02F 1/78* (2013.01); *B09C 1/08* (2013.01); *C02F 1/02* (2013.01); *C02F 1/24* (2013.01);
(Continued)

(58) Field of Classification Search
CPC ...... C02F 1/02; C02F 1/04; C02F 1/26; C02F 1/28; C02F 1/24; C02F 1/40; C02F 1/58;
(Continued)

(56) References Cited

U.S. PATENT DOCUMENTS

| 5,277,981 A | 1/1994 | Haider et al. |
| 6,787,038 B2 | 9/2004 | Brusseau et al. |

(Continued)

FOREIGN PATENT DOCUMENTS

| DE | 4006435 A1 * | 9/1991 | ............... C02F 1/20 |
| WO | 2004-071960 | 8/2004 | |

(Continued)

OTHER PUBLICATIONS

Machine translation of WO 2016096885A1 (2016) (obtained from Google Patents Oct. 2018) (Year: 2016).*

(Continued)

*Primary Examiner* — Lucas A Stelling
(74) *Attorney, Agent, or Firm* — Finch & Maloney PLLC

(57) ABSTRACT

Disclosed are methods, apparatuses and systems for the remediation of contaminated soils, groundwater, water, and/or waste using a combination of reagents. The disclosed methods may be used to treat various recalcitrant halogenated substances, such as perfluoroalkyls and polyfluoroalkyls. Particular combinations of reagents that may be used in the disclosed methods include but are not limited to: (1) persulfate, oxygen and ozone; (2) persulfate, salt, oxygen and ozone; (3) persulfate, phosphate, and/or oxygen; (4) persulfate, phosphate, oxygen and ozone; (5) persulfate, phosphate, salt and oxygen (6) persulfate, phosphate, salt, oxygen and ozone; (7) oxygen and salt; and (8) air and salt. The disclosed methods may enhance destruction of organic contaminants in the liquid phase and may also control the rate of aerosol or foam formation relative to the rate of chemical oxidation and/or reduction/transfer.

12 Claims, 3 Drawing Sheets

Related U.S. Application Data

(60) Provisional application No. 62/435,423, filed on Dec. 16, 2016, provisional application No. 62/342,849, filed on May 27, 2016, provisional application No. 62/286,785, filed on Jan. 25, 2016.

(51) Int. Cl.

| | | |
|---|---|---|
| *C02F 1/04* | (2006.01) | |
| *C02F 1/24* | (2006.01) | |
| *C02F 1/26* | (2006.01) | |
| *C02F 1/28* | (2006.01) | |
| *C02F 1/58* | (2006.01) | |
| *C02F 1/72* | (2006.01) | |
| *C02F 1/78* | (2006.01) | |
| C02F 101/30 | (2006.01) | |
| C02F 101/32 | (2006.01) | |
| C02F 101/36 | (2006.01) | |

(52) U.S. Cl.
CPC ............. *C02F 1/583* (2013.01); *C02F 1/72* (2013.01); *C02F 1/722* (2013.01); *C02F 1/727* (2013.01); *C02F 1/04* (2013.01); *C02F 1/26* (2013.01); *C02F 1/28* (2013.01); *C02F 2101/305* (2013.01); *C02F 2101/32* (2013.01); *C02F 2101/322* (2013.01); *C02F 2101/327* (2013.01); *C02F 2101/36* (2013.01); *C02F 2101/363* (2013.01); *C02F 2101/366* (2013.01); *C02F 2303/26* (2013.01)

(58) Field of Classification Search
CPC .. C02F 1/583; C02F 1/78; C02F 1/722; C02F 1/727; C02F 2101/305; C02F 2101/32; C02F 2101/322; C02F 2101/327; C02F 2101/36; C02F 2101/363; C02F 2101/366; C02F 2303/26; B09C 1/002; B09C 1/08
See application file for complete search history.

(56) References Cited

U.S. PATENT DOCUMENTS

| | | |
|---|---|---|
| 8,080,158 B2 | 12/2011 | Lee et al. |
| 8,137,703 B2 | 3/2012 | Chiba et al. |
| 8,628,659 B1 | 1/2014 | Taylor, III |
| 9,169,141 B2 | 10/2015 | Ma et al. |
| 9,409,216 B1 | 8/2016 | Ball |
| 2012/0277516 A1* | 11/2012 | Ball ................. B09C 1/002 588/315 |

FOREIGN PATENT DOCUMENTS

| | | |
|---|---|---|
| WO | 2012-177526 | 12/2012 |
| WO | 2013/016775 | 2/2013 |
| WO | WO-2016096885 A1 * | 6/2016 ............ B01D 1/305 |

OTHER PUBLICATIONS

Machine translation of DE 4006435 A1 (1991) (obtained from Google Patents Oct. 2018) (Year: 1991).*
International Search Report and Written Opinion received for Patent Application No. PCT/US2017/013433, dated May 4, 2017, 17 pages.
International Preliminary Report on Patentability received for Patent Application No. PCT/US2017/013433, dated Jul. 31, 2018, 12 pages.
Ebersbach, Ina, "Aerosol-basierte Eliminierung von per- and polyfluorierten Tensiden aus wässrigen Lösungen", Apr. 2015, Wuppertal University, 170 pages including English Abstract.
John Horst et al., "Water Treatment Technologies for PFAS: The Next Generation", 2018, Groundwater Monitoring & Remediation 38, No. 2, National Ground Water Association, pp. 13-23.
Abdalla H. Karoyo et al., "Counterion Anchoring Effect on the Structure of the Solid-State Inclusion Complexes of β-Cyclodextrin and Sodium Perfluorooctanoate", Sep. 1, 2015, The Journal of Physical Chemistry, vol. 119, American Chemical Society, pp. 22225-22243.
Abdalla H. Karoyo et al., "Nano-Sized Cyclodextrin-Based Molecularly Imprinted Polymer Adsorbents for Perfluorinated Compounds—A Mini-Review", Jun. 215, Nanomaterials, vol. 5, pp. 981-1003.
Catherine A. Barton et al., "Solid Vapor Pressure and Enthalpy of Sublimation for Perfluorooctanoic Acid", 2008, Journal of Chemical & Engineering Data, vol. 53, No. 4, American Chemical Society, pp. 939-941.

* cited by examiner

- Original PFAS still in reactor - 0.1%
- Unidentified PFAS or breakdown products in either reactor or trap - 63%
- Original PFAS transferred to traps - 26%
- Fluoride in reactor - 11%
- Fluoride in trap - 0.6%

SOIL AND WATER REMEDIATION METHOD AND APPARATUS FOR TREATMENT OF RECALCITRANT HALOGENATED SUBSTANCES

CROSS REFERENCE TO RELATED APPLICATIONS

This application in a continuation of PCT/US2017/013433, filed on Jan. 13, 2017, which claims benefit of U.S. Provisional Patent Application Nos. 62/286,785 (filed Jan. 25, 2016), 62/342,849 (filed May 27, 2016), and 62/435,423 (filed Dec. 16, 2016), all of which are incorporated by reference herein in their entireties.

BACKGROUND

Highly recalcitrant halogenated substances, such as poly- and perfluoroalkyl substances (PFAS), are not readily degraded or destroyed by previously known chemical oxidation, chemical reduction, combined chemical oxidation/reduction or bio-oxidation methods.

DETAILED DESCRIPTION

Figure 1:
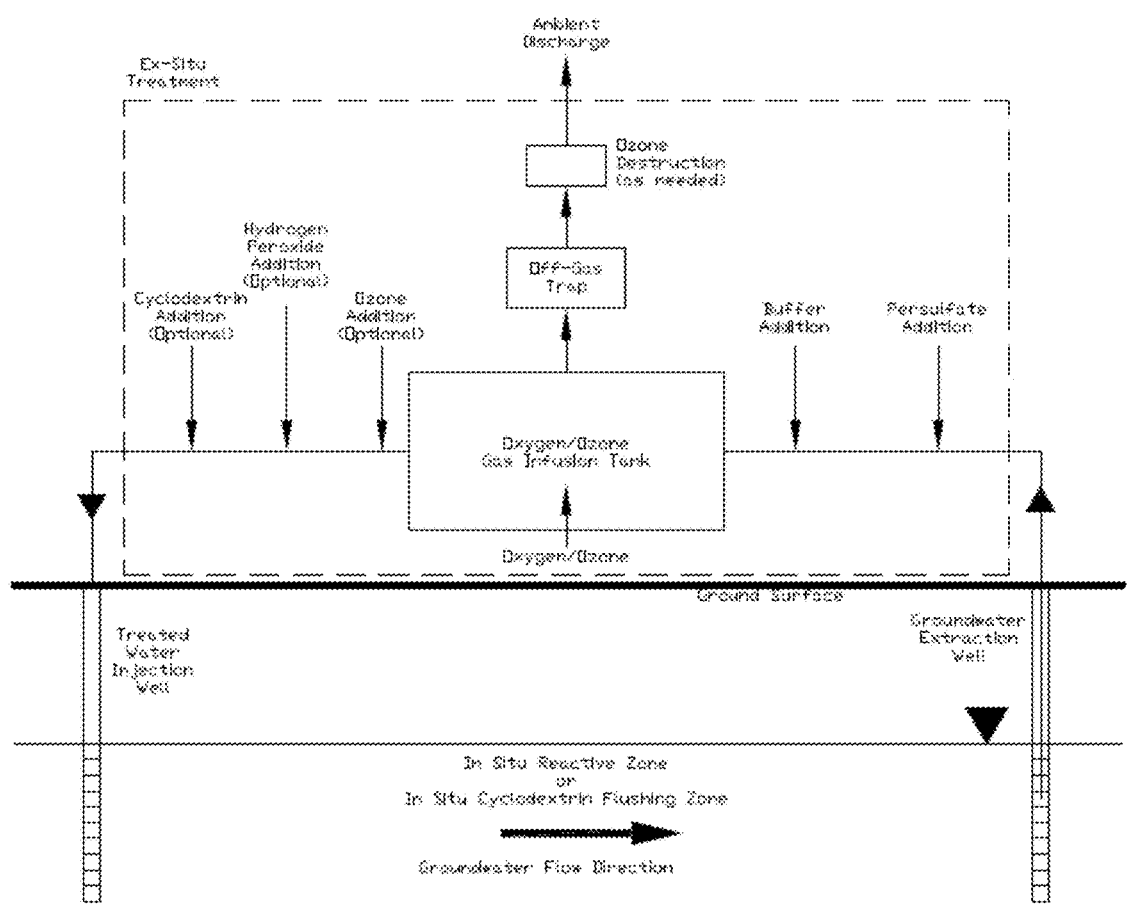
FIG. 1 is a schematic diagram illustrating a combined in-situ and ex-situ treatment process flow, in accordance with various embodiments of the subject disclosure.

The present disclosure relates to methods and apparatuses for the remediation of contaminated water and/or soil and, in particular, to the reduction of the concentration of organic compounds in water and/or soil such as the highly recalcitrant halogenated substances, such as poly- and perfluoroalkyl substances (PFAS), that are not readily degraded or destroyed by other chemical oxidation, chemical reduction, combined chemical oxidation/reduction or bio-oxidation methods. The methods and apparatuses described herein may, in some cases, also be effective for less recalcitrant organic compounds of concern.

Both State and Federal governments in the United States and the governments of other countries have regulations governing hazardous organic and inorganic contaminants in the environment. Subsurface soil and groundwater contamination with organic and inorganic contaminants has been of concern to State, Federal and foreign governments since the 1970's. Action levels and clean-up standards have been promulgated by both State and Federal governments for numerous organic and inorganic contaminants.

Regulated organic contaminants in the subsurface environment include, but are not limited to: polychlorinated biphenyls (PCBs); halogenated volatile organic compounds (CVOCs), such as tetrachloroethene (PCE), trichloroethene (TCE), trichloroethane (TCA), dichloroethene (DCE), vinyl chloride; fuel constituents such as benzene, ethylbenzene, toluene, xylene, methyl tert butyl ether (MTBE), tertiary butyl alcohol (TBA), polynuclear aromatic hydrocarbons (PAHs), ethylene dibromide (EDB); pesticides such as (but not limited to) DDT; herbicides such as (but not limited to) Silvex. Pharmaceuticals, personal care products, aqueous film-forming foam (AFFF), and coatings are other products that also may contain highly recalcitrant chemicals.

The State and Federal regulations that govern these contaminants in the subsurface outline protocols for subsurface investigation to identify the extent of contamination, identification of the human health and ecological risk posed by the contaminants, development of remedial action alternatives for reducing or eliminating any significant risk posed by the contaminants, and selection and implementation of remedial measures to achieve the remediation goals. More recently, the federal and state governments in the US and around the world have begun to regulate a set of new "emerging contaminants" based on discovery of the widespread distribution in the environment and evidence of detrimental toxicological health effects. The new emerging contaminants include poly- and perfluoroalkyl substances (PFAS); 1,4-dioxane, and others. Currently, toxicological data exists for two particular PFAS compounds, perfluorooctanesulfonate (PFOS) and perfluorooctanoic acid (PFOA). It is anticipated that toxicological health effects for other PFAS compounds will become available in the near future and will most likely be followed by regulatory standards at the federal and state levels. Federal (USEPA) provisional health advisory levels for drinking water for PFOS and PFOA have been set at 0.2 parts per billion (ppb) and 0.4 ppb, respectively. Some European countries have established similar regulatory limits allowable in drinking water.

Perfluoroalkyl acids (PFAAs) were utilized in aqueous film-forming foams (AFFF) and are now detected at many fire training areas (FTAs) throughout the world. PFAAs commonly co-occur with other priority pollutants, particularly volatile organic compounds in groundwater. PFAAs are anthropongenic compounds have a carbon chain backbone that is fully-fluorinated. PFAAs are primarily either perfluoroalkyl carboxylates (PFCAs) or perfluoroalkyl sulfonates (PFSAs). PFAAs one of the most stable organic compounds due to the strong fluorine-carbon bonds. Therefore, PFAAs are resistant to hydrolysis, photolysis, and aerobic and anaerobic biodegradation. The longer-chain PFAAs, such as perfluorooctanoic acid (PFOA) and perfluorooctanesulfonic acid (PFOS), were commonly used in industrial and commercial processes. Due to due their oleophobic and hydrophobic properties, they were incorporated into non-stick, waterproof, and fire-resistant materials, such as lubricants, paints, polish, food packaging and aqueous film-forming foams (AFFFs). PFOS and PFOA can migrate through terrestrial and marine environments with very little degradation. In addition, PFOS and PFOA may be also be produced from PFAA-precursors in the environment via degradation or biotransformation. PFOA and PFOS, and polyfluorinated PFAA-precursor compounds have all been identified in groundwater and surface water. These compounds are expected to be mobile and persist in groundwater or surface water years after use.

Many traditional in situ remediation strategies, such as in situ chemical oxidation (ISCO), or bioremediation, are ineffective for treatment of PFAAs, because of the strong stability and those physicochemical properties of PFAAs that make them recalcitrant. Ex situ sorption-based remediation processes, such as granular activated carbon (GAC) adsorption and anionic resin filtration have had success in treating these compounds. When present, any VOC co-contaminants may compete with PFAAs for sorption sites to potentially limit the applicability of these technologies in the field. Recently, nanofiltration has shown promise for PFAA removal. Ex-situ (above-ground) remediation methods involving groundwater extraction and treatment are significantly more costly than in situ methods. Ex-situ remediation methods will require many years of operation until PFAA clean-up targets (ng/L) may be achieved.

Strong oxidizing agents are reported in the literature to treat contaminated soil and water by chemically degrading hazardous chemicals using ISCO or ex-situ chemical oxidation (ESCO). However, there are fewer options for the chemical destruction of PFAS compounds by traditional oxidation methods. More recent research indicates that "higher energy" advanced oxidation processes such as sonic enhanced ozonation that combines two technologies sonication and ozonation may be required for PFAA degradation. However, degradation of PFOA and PFOS has been shown using ozone and ozone with peroxide under alkaline conditions at pH 11.

Recent literature indicates that activated persulfate-based oxidation of PFOA can be performed at relatively low temperatures of 20-40° C. This suggests that persulfate may have potential as an in situ treatment technology for subsurface PFAA contamination.

Methodologies and Devices

The subject matter of this application may involve, in some cases, interrelated products, alternative solutions to a particular problem, and/or a plurality of different uses of a single system or article.

In some embodiments, an above ground (ex-situ) reactor is disclosed in which contaminated water, waste, and/or groundwater may be introduced along with air, ozone, oxygen and optionally other oxidants to both destroy, breakdown, and/or defluorinate PFAS. In these and other embodiments, PFAS may be physically removed from the water, waste and/or groundwater by concentrating the PFAS into the bubbles/aerosols that can then be trapped and collected. These processes (physical removal and destruction/breakdown/defluorination of PFAS) can be performed either sequentially (in any order) or simultaneously.

In other embodiments, an in-situ "reactor" is disclosed in which water that is oxygenated or ozonated (for example, by micro to nanobubbles) or treated groundwater (for example, groundwater that is treated with salt, buffer and oxidants) is either injected into the groundwater (possibly after being recirculated) or formed in-situ by injecting the gas and forming the micro to nanobubbles in the groundwater aquifer to thereby oxidize, transform, breakdown and defluorinate PFAS in the groundwater. In some embodiments, a nanobubble generating device may be used. In some embodiments, cyclodextrin or another cyclic oligosaccharide may be injected into the groundwater to facilitate removal of PFAS. In these and other embodiments, the gas headspace above the groundwater table containing the bubbles/aerosols and concentrated PFAS may also be removed. Alternatively, this fluid recirculation could be performed in a vertical recirculation well(s) or vapor stripping well(s). Alternatively, horizontal wells could be used with one or more horizontal wells below the groundwater surface and one or more above the groundwater surface in the unsaturated zone soil.

In one aspect a method of reducing the concentration of an organic contaminant such as PFAS in soil is provided, the method comprising introducing persulfate, phosphate, and/or oxygen into a saturated zone to oxidize, reduce, defluorinate or otherwise degrade at least a portion of the organic contaminant.

In another aspect a method of reducing the concentration of an organic contaminant such as PFAS in soil is provided, the method comprising introducing persulfate, phosphate, and/or oxygen where the oxygen is supplied by oxygen gas or air into a saturated zone to oxidize, reduce, defluorinate or otherwise degrade at least a portion of the organic contaminant with the gas inducing mixing of the oxidant to enhance contact with the contaminant.

In another aspect a method of reducing the concentration of an organic contaminant such as PFAS in water is provided, the method comprising introducing persulfate, phosphate, and/or oxygen into the water to oxidize, reduce, defluorinate or otherwise degrade at least a portion of the organic contaminant.

In another aspect a method of rendering the recalcitrant organic contaminant more readily amendable to bioremediation by transforming the recalcitrant organic contaminant to biodegradable compounds.

In another aspect a method of reducing the concentration of organic contaminants such as PFAS in concentrated waste is provided, the method comprising introducing persulfate, phosphate, and/or oxygen into the wastes to oxidize, reduce, defluorinate or otherwise degrade at least a portion of the organic contaminant.

In another aspect, a method of controlling the rate of foam or aerosol formation to the rate of chemical oxidation, reduction, defluorination, and/or other degradation of at least a portion of the organic contaminant by controlling the gas phase pressure or vacuum, gas flow rate, gas bubble size and/or bubble density per volume solution with or without mechanical mixing is provided, the method comprising introducing persulfate, phosphate, and/or oxygen and ozone at a pH greater than, equal to, or less than pH 5.0 in the soil to remove a portion of the organic contaminant from soil. In some embodiments, cyclodextrin could optionally be added in addition to the oxidants to encapsulate some PFAAs and/or to control the rate of transfer to aerosol or foam or enhance removal of PFAAs from soil.

In another aspect, a method of controlling the rate of foam or aerosol formation to the rate of chemical oxidation, reduction, defluorination or otherwise degradation of at least a portion of the organic contaminant by controlling the water temperature, gas flow rate, water agitation, gas phase pressure or vacuum, gas bubble size and/or bubble density per volume solution with or without mechanical mixing is provided, the method comprising introducing persulfate, phosphate, and/or oxygen and ozone at a pH greater than, equal to, or less than pH 5.0 in the water to remove a portion of the organic contaminant from water. In some embodiments, cyclodextrin could optionally be added in addition to the oxidants to encapsulate some PFAAs and/or to control the rate of transfer to aerosol or foam or enhance removal of PFAAs from water.

In another aspect, a method to oxidize, reduce, defluorinate or otherwise degrade at least a portion of the organic contaminant by introducing oxygen and ozone gas to the foam and/or aerosol in the gas phase above the water is disclosed.

In another aspect, a method to oxidize, reduce, defluorinate or otherwise degrade at least a portion of the organic contaminant by controlling the gas flow rate, gas phase overhead pressure or vacuum in the vicinity of the foam and/or aerosol above the water is disclosed.

In another aspect, a method of controlling the rate of foam or aerosol formation to the rate of chemical oxidation, reduction, defluorination or otherwise degradation of at least a portion of the organic contaminant by controlling the gas flow rate, gas bubble size and/or bubble density per volume solution without any mechanical mixing is provided, the method comprising introducing persulfate, phosphate, and/or oxygen and ozone at a pH greater than, equal to, or less than pH 5.0 in the waste to reduce the organic contaminant in the waste.

In another aspect, a method to oxidize, reduce, defluorinate or otherwise degrade at least a portion of the organic contaminant by introducing oxygen and ozone gas to the foam and/or aerosol in the gas phase above the waste is disclosed.

In another aspect, a method to oxidize, reduce, remove, defluorinate or otherwise degrade at least a portion of the organic contaminant by controlling the gas phase overhead pressure or vacuum in the vicinity of the foam and/or aerosol above the waste is disclosed.

In another aspect, methods of in-situ aquifer flushing are disclosed in which water containing cyclodextrin or another cyclic oligosaccharide is injected to subsurface soil and groundwater to enhance PFAS removal from the soil and groundwater as it passes through the soil matrix to a hydraulically downgradient groundwater extraction well (or a single well push-pull method may alternatively be used) where groundwater containing the cyclodextrin-PFAS complex may be extracted and removed using methods described herein, including but not limited to ex-situ treatment using the "gas infusion" reactor, as herein described.

DETAILED DESCRIPTION

The following patents are herein incorporated by reference in their entireties: U.S. Pat. Nos. 7,667,087, 8,049,056, and 9,409,216. In U.S. Pat. No. 7,667,087, a method and apparatus for destruction of organic contaminants using persulfate, phosphate, peroxide, and ozone is disclosed. In U.S. Pat. No. 8,049,056, a method for destruction of organic contaminants using oxidants and the stabilization of ozone using an oligosaccharide is disclosed. In U.S. Pat. No. 9,409,216, a method for destruction of organic contaminants using a cyclic oligosaccharide and persulfate is disclosed.

In some embodiments, methods for reducing the concentration of organic (halogenated or otherwise) compounds in soil, concentrated wastes, water and/or groundwater is provided. Contaminated soil in the saturated zone, smear (i.e., capillary) zone and/or unsaturated zone can be remediated to concentrations that meet local, federal or other mandated or chosen levels. Water, groundwater and/or soil may be decontaminated in-situ or ex-situ using the disclosed methods. Concentrated wastes may be decontaminated ex-situ, for example in a reactor. The methods may involve the introduction or co-introduction of oxidants, such as persulfate, phosphate, and/or oxygen in combination, or a combination of persulfate, phosphate, other salts and/or oxygen with or without ozone into any of the saturated, unsaturated and/or smear zones. One or more additional oxidants, such as hydrogen peroxide or other peroxides may also be used in combination with the oxidant(s) Results show that the co-introduction of these species may provide greater benefits than using them independently.

FIG. 1 illustrates a combined in-situ and ex-situ treatment process flow, in accordance with various embodiments of the subject disclosure. Specifically, FIG. 1 shows an in-situ reactive zone or flushing zone treatment method in which one or more reagents are introduced into the soil or groundwater and groundwater is then extracted at a point downstream from the point of injection. In some embodiments, reagents may be introduced into the soil or ground water through a trench that may be filled with gravel below the ground water table. The trench may or may not have sheeting walls on the sides of the trench extending from ground surface to the ground water table or below. In some examples, the trench may be backfilled with soil or gravel or a solid phase extraction (SPE) agent from the ground surface to the top of the ground water table or may not be. In some cases, the SPE agent may be, for example, silica, alumina or activated carbon (e.g, granular activated carbon). The SPE agent may be used to adsorb the PFAA aerosol. Ozone gas may be introduced into the trench above the ground water table to chemically oxidize, defluorinate, or otherwise remove the PFAA in foam or aerosol above the groundwater table. The ozone gas may be introduced to regenerate the SPE agent in-place. The pressure of the ozone gas may be 1, 2, or 3 atmospheres or greater. In some embodiments, an air vacuum may be applied to the backfilled or un-backfilled trench above the groundwater table to remove PFAA-containing foam or aerosol. In some particular example embodiments, a cyclic oligosaccharide, for example cyclodextrin, may be injected into the groundwater (with or without other reagents) to facilitate removal of contaminated materials. After in-situ treatment and/or removal, the groundwater may then optionally be treated by any type of desired ex-situ process, such as treatment in a gas infusion tank device, as described in detail below.

FIG. 1 also illustrates an ex-situ treatment process in which extracted groundwater is treated in a reactor aboveground. As shown in FIG. 1, ex-situ treatment of the extracted groundwater may include, in some embodiments, treatment with one or more of the following reagents: persulfate, a buffer (e.g., phosphate), ozone, oxygen, hydrogen peroxide and cyclodextrin. In some particular embodiments, a gas infusion tank reactor may be used for various ex-situ treatment processes. Any suitable design may be used to implement a gas infusion tank reactor as described herein. For example, in some cases, a gas infusion tank reactor may include one or more reaction compartments that are connected in series, such that liquid flows from one reaction compartment to the next once a certain volume of fluid accumulates in a reaction compartment. Treatment reagents may be introduced to the fluid in one reaction compartment or in multiple reaction compartments. In some embodiments, reagents are injected into the bottom or a lower area of the reaction compartment(s). In some cases, gaseous reagents, such as oxygen or a combination of oxygen and ozone may be introduced into the solution in the reactor. The gaseous reagents may be introduced as micro bubbles and/or nano bubbles, in some embodiments. The hydraulic detention time of the reactor may be any time and in some embodiments is at least 10 minutes, 30 minutes, at least 1 hour, at least 2 hours, at least 4 hours, at least 8 hours, or at least 24 hours. Ozone gas at a pressure of 1, 2, or 3 atmospheres may optionally be introduced above the water level in the reactor to contact the PFAA containing foam and/or aerosol in the gas phase to remove, de-fluorinate, or otherwise reduce its concentration. Alternatively or additionally, in some cases, an air vacuum may be applied to the gas phase to remove the PFAA foam or aerosol from the reactor. Either pressure or vacuum applied to the gas phase may be used to control the rate of foam and/or aerosol formation relative to the rate of chemical oxidation in the liquid phase. Before or after ex-situ treatment, the extracted groundwater may, in some cases, be further treated, such as by activated carbon filtration or other treatment methods.

It is to be understood that in some cases, the disclosed methods may be applied either in-situ or ex-situ, or a combination or both in-situ and ex-situ, depending on the desired application. The following descriptions are thus intended to apply to both in-situ and/or ex-situ treatment methods, except as otherwise explicitly stated.

In some embodiments, ozone gas is introduced above the water into the gas phase where PFAA containing foam and/or aerosol may be formed to provide chemical oxidation, reduction, defluorination or other degradation of at least a portion of the organic contaminant.

In some embodiments, the gas phase may be pressurized or placed under vacuum to assist with controlling the rate of foam and or aerosol formation relative to the rate of chemical oxidation, reduction, defluorination or other degradation of the organic contaminant in the water.

Different types of soils may be treated according to the disclosed methods, including, for example, sand, rock, sediment, loam and clay. Waters that can be treated include, for example, groundwater, waste water, process water and runoff.

Organic contaminants that may be remediated include but are not limited to, halogenated substances, including poly- and perfluoroalkyl substances (PFAS), organic (halogenated or otherwise) compounds (VOCs), semi-volatile organics (SVOC's) polychlorinated biphenyls (PCBs); chlorinated volatile organic contaminants (CVOCs), benzene, ethylbenzene, toluene, xylene (BTEX), methyl-tert-butyl ether (MTBE), tertiary butyl alcohol (TBA), polynuclear aromatic hydrocarbons (PAHs), ethylene dibromide (EDB); pesticides and herbicides such as DDT and Silvex, tetrachloroethene (PCE), trichloroethene (TCE), trichloroethane (TCA), dichloroethane (DCA), methylene chloride, carbon tetrachloride, dichloroethene (DCE), vinyl chloride, light non-aqueous phase liquids (LNAPL) and fuels such as gasoline, diesel fuel, fuel oils (including #2, #4 and #6), jet fuels (e.g., JP4 and JP5). Pharmaceuticals, personal care products (PCP), endocrine disruptors and waste containing these organic contaminants may also be remediated.

In some aspects, methods and systems are provided for reducing the concentration of organic (halogenated or otherwise) compounds in soil and/or groundwater. Oxidants, such as persulfate, phosphate, and/or oxygen in combination or a combination of persulfate, phosphate, other salts and/or oxygen with or without ozone may be introduced into the saturated zone, resulting in an area of influence around the injection point in which organic contaminants are oxidized, reduced, defluorinated or otherwise destroyed and therefore reduced in concentration at least in part. Below the area of influence, oxygen gas sparging can be introduced into the saturated zone creating both mounding and a mixing zone and further contact between the persulfate, phosphate, and/ or oxygen in the smear zone and saturated zone. Enhanced bioremediation in a saturated zone may occur after chemical oxidation of the contaminants occurs due to the residual sulfate, phosphate, and oxygen.

In select embodiments, reactants may be added to the contaminant to chemically alter the contaminant in the liquid phase. However, in other embodiments, the reaction conditions may be selected to urge the contaminant from the liquid phase into an aerosol and/or foam. While in such embodiments, some chemical destruction of the contaminant may occur in the liquid phase, an appreciable amount of contaminant may be physically transferred to an aerosol/ foam without being chemically altered. In some of these embodiments, the resulting aerosol and/or foam may be further treated to destroy or isolate contaminants present in the aerosol/foam. For example, in some embodiments, one or more gases may be introduced to a reactor via a nanobubble diffuser or other nanobubble generating device positioned in contaminated water or groundwater. The reactor may have headspace above the fluid that allows the aerosol/foam to be collected and passed through a trap (to collect the contaminants in a much more concentrated form) before discharge of the gas to the atmosphere. In such embodiments, at least one the following removal processes may occur: (a) physical transfer of the surfactant-like PFAS via oxygen and/or ozone bubbles and aerosols from the aqueous (fluid) phase to the gas phase where they can be collected and concentrated in a trap; (b) oxidation, transformation, breakdown and defluorination of the PFAS by oxygen in the nanobubbles formed in the aqueous phase; (c) oxidation, transformation, breakdown and defluorination of the PFAS by ozone in the nanobubbles formed in the aqueous phase; and (d) oxidation, transformation, breakdown and defluorination of the PFAS by ozone in the bubbles and aerosols in the gas phase.

Gaseous reagents may be dissolved in an aqueous system or may be otherwise introduced to the contaminant. Any gas or gas mixture may be introduced to the contaminant, such as air, nitrogen, oxygen, ozone and/or nitrous oxide. In some embodiments, one or more gaseous reagents are introduced in the form of nano bubbles or micro bubbles. In some embodiments, gaseous reagents may be introduced both in dissolved form and in the form or micro and/or nano bubbles. As used herein, the term "nano bubble" refers to a gas bubble having a diameter of less than 1.0 micron and the term "micro bubble" refers to a gas bubble having a diameter of between 1.0-100 microns. In some embodiments, increasing the bubble size of gaseous reagents will decrease aerosol formation, while in other embodiments, increasing bubble size will increase aerosol formation. Accordingly, the size of the gaseous bubbles may be adjusted to either increase or reduce aerosol formation, depending on the desired level of aerosols.

In particular embodiments, one or more gaseous reagents having an average bubble size (diameter) of less than 50 microns, less than 40 microns, less than 30 microns, less than 20 microns, less than 10 microns, less than 1 micron, less than 0.8 micron, less than 0.6 micron, less than 0.4 micron, less than 0.2 micron, less than 0.1 micron, or less than 0.05 micron may be used. In other embodiments, gaseous reagents having an average bubbles size of at least 0.05 micron, 0.1 micron, 0.2 micron, 0.4 micron, 0.6 micron, 0.8 micron, 1.0 micron, 10 microns, 20 microns, 30 microns, 40 microns, or 50 microns may be used.

The bubble size of gaseous reagents can be selected based at least in part on the ionic strength of the oxidant solution, the pH of the solution, the total dissolved solids (TDS) of the solution, the temperature of the solution and/or the concentration of the target compound(s). For example, in some embodiments, effective transport of oxygen and/or ozone bubbles may be accomplished with a bubble size of less than 1 micron, less than 10 microns, or less than 20 microns.

In some embodiments, the rate of chemical reaction of the contaminant in relation to physical transfer of the contaminant to an aerosol and/or foam may be controlled by altering one or more reaction conditions. For example, in some embodiments, any number of the following reaction conditions may be adjusted to change whether contaminants are treated in the aqueous phase or are physically transferred to an aerosol/foam. Reaction conditions that may be adjusted include, but are not limited to: the pressure of the reactor, the pressure of introduced gas, the flow rate of introduced gas, the percent ozone in introduced gas, the average gas bubble size, the range of gas bubble sizes, the concentration of contaminant in the aqueous phase, the dimensions of the reactor, the depth of the aqueous solution, the extraction rate of aerosol/foam in headspace, the pH of the solution, the concentration of hydrogen peroxide, the concentration of persulfate present and the salt or buffer concentration.

In some embodiments, the pressure of one or more gaseous reagents may be selected to be within the range of 5 to 50 psi. In these and other embodiments, the flow rate of one or more gaseous reagents may be selected to be within the range of 1 ml/minute to 1 cubic feet/hour per square inch of the reactor in the horizontal direction and/or within a range of gas to liquid of 1% to 25%.

In various embodiments, the percent ozone concentration in a carrier gas, such as oxygen, introduced in the reactor may be adjusted. For example, in some embodiments the percent ozone concentration in the carrier gas (for example, oxygen gas) may be no more than 20%, within the range of 0-15%, within the range of 0-10% or within the range of 0-5%.

In some embodiments, the dimensions of the reactor may be adjusted such that the reactor volume to reactor cross-sectional area perpendicular to rising bubbles is either increased or decreased. For example, in some embodiments, the reactor may have a ratio of volume to cross-sectional area ($m^3/m^2$) perpendicular to rising bubbles that is within the range of 1:1 to 1,000:1. In these and other embodiments, the pH of the aqueous solution may be within the range of 4 to 10.5.

In various embodiments, reactants may be added to or removed from the reactor. For example, in some embodiments, the concentration of hydrogen peroxide in the reactor may be adjusted to be at least 1 ppm, at least 5 ppm, at least 10 ppm, or greater than 10 ppm. In these and other embodiments, the concentration of persulfate may be adjusted to be within the range of 1 to 100 g/L. In various embodiments, the persulfate may be heated to a temperature above the temperature of the liquid phase of the reactor. In some embodiments, the concentration of salt or other buffer present may be adjusted to be within the range of 0.1 to 10 g/L.

In some particular embodiments, containment may be removed from water, wastewater and/or soil in a multi-step process. For example, in some embodiments, a contaminant may be exposed to nanobubbles of a gas (such as oxygen, air or nitrogen) in a solution having at least one ionic species present. In some such embodiments, the reaction conditions may transfer the contaminant to an aerosol and/or foam that may be collected. Collection may be made, for example, using a water trap or a solid phase extraction using silica (e.g., Florisil) or alumina for instance. The aerosol and/or foam may be more highly concentrated with contaminant than the starting material. The more highly concentrated material may then subsequently be treated, for example, by the introduction of heated persulfate. The treated water/wastewater/soil/aerosol/foam may optionally be further treated by various processes. For example, additional oxidants, such as buffered or unbuffered oxygen, ozone and/or persulfate may be introduced to the material. In these and other embodiments, the material may be filtered through granular activated carbon (GAC) or other chemical filters to remove additional contaminant.

A salt such as sodium chloride or sodium persulfate may serve several purposes when used in the disclosed methods. For example, sodium persulfate may act as an oxidant, may increase ionic strength to aid in maintaining a small bubble size, and/or may be used as a conservative tracer for hydraulic assessments along with specific conductance. In these and other embodiments, persulfate (either heated or unheated) may be used to treat aerosols and/or foams that are formed in the reactor.

In some embodiments, methods are provided for reducing the amount of halogenated organic contaminants in a soil or water sample either in-situ or ex-situ. In some embodiments, at least a portion of recalcitrant organic contaminant present may be aerosolized, transferred to foam, and/or oxidized. “At least a portion” means at least some of the molecules present in the sample being treated will be oxidized. For clarity, “at least a portion” does not mean that only a portion of a specific molecule is oxidized. “Soil” as used herein includes soil, sediment, clay and rock.

It has been found that a combination of water soluble inorganic reagents, such as persulfate, phosphate, and/or oxygen in combination or persulfate and phosphate in combination with oxygen and/or ozone may provide a level of compound destruction and/or transfer to aerosol/foam that is superior to that of either one of the reagents used without the other, even at much greater concentrations. This data is surprising as prior to this discovery, it was believed that only extremely strong oxidizing agents, such as ozone, could effectively destroy recalcitrant organic materials (e.g., halogenated organic contaminants). However, as described in detail below, the disclosed methods may significantly reduce the concentration of recalcitrant organic materials by using oxidants with comparatively lower redox potentials (e.g., oxygen in combination with persulfate). It is believed that oxygen in combination with persulfate may form unidentified radical species responsible for the degradation of PFAS.

It has also been found that a combination of water soluble inorganic reagents, such as persulfate, phosphate, and/or oxygen in combination, or persulfate and phosphate in combination with oxygen and/or ozone may transform the surfactant like properties of some of the PFAS compounds to render them less of a surfactant while making them more amenable to oxidation/reduction and defluorination.

In the disclosed methods of reducing the concentration of an organic contaminant in soil, water, and/or waste, persulfate and oxygen gas may be introduced to the organic contaminant to form an aerosol and/or foam containing PFAS. The disclosed methods may alternatively or additionally oxidize at least a portion of the organic contaminant. In some embodiments, a buffer may also be introduced. For example, a phosphate buffer may be used in some embodiments. However, in other embodiments, a phosphate buffer need not be present. In these and other embodiments, a hydrogen source may also be introduced. For example, in some embodiments, hydrogen gas may be introduced to the organic contaminant along with the other reagents used. The disclosed methods may be capable of reducing the concentration of recalcitrant organic materials (e.g., halogenated organic contaminants) by at least 50%, at least 60% at least 75%, at least 80%, at least 90%, at least 95%, or at least 99%, in some embodiments. In some embodiments, the methods disclosed herein can destroy, or break down, greater than 50%, greater than 75%, greater than 90%, greater than 95%, greater than 99% or greater than 99.9% of the perfluorinated materials that are present in a sample such as water, soil, waste water, waste streams or solvent systems. These levels of PFAA removal via transfer to aerosol or foam or destruction can be obtained in less than 12 hours, less than six hours, less than two hours or less than one hour of contact time. As used herein, the terms "destroy" and "break down" mean that the chemical structure of the compound is altered. For example, a perfluoroalkyl acid is considered "destroyed" or "broken down" if one or more fluorine atoms are removed from the alkyl backbone of the original compound.

Persulfate is a preferred oxidant for remediating soil for several reasons including that it has minimal reactivity with the soil itself and therefore all, or most, of the oxidizing power of the reagent is available to oxidize organic contaminants. Persulfate may be a long-lived oxidant, and this increased longevity can result in an increased radius of influence and can help to minimize the required number of injection points throughout the contaminated area. Persulfate may be introduced to water or soil as a liquid, typically in the form of an aqueous solution of sodium persulfate. Oxygen may be provided as a gas, salt, or liquid for example, pure oxygen gas or air can be sparged into the aqueous solution of persulfate and/or phosphate. In some embodiments, the pure oxygen or air may be passed through an ozone generator to introduce a mixture of ozone, typically up to 20 percent ozone, with either oxygen or air into the aqueous solution. In some embodiments, oxygen can be supplied as a peroxide salt of calcium or magnesium oxide. In other embodiments, oxygen can be supplied as a liquid by adding hydrogen peroxide. Hydrogen peroxide may be used in solution form and in some embodiments may be mixed with persulfate.

It is believed that use of oxygen or ozone in conjunction with persulfate and/or phosphate may result in a high rate of conversion to oxidizing radicals that can provide for a wide radius of influence from the injection site. If hydrogen peroxide as a liquid form of oxygen addition a high rate of conversion to oxidizing radicals may result and may also contribute to a wide radius of influence. Without wishing to be bound by theory, additional sources of hydrogen may be helpful to facilitate defluorination of the PFAS and corresponding breakdown products. For example, it is possible that the hydrogen ($H^+$) liberated from the phosphate present (Na2HPO4) is used in a combined oxidation/reduction reaction or that the HPO4 anion itself is used.

As will be appreciated in light of this disclosure, the disclosed methods may present novel pathways to activate persulfate. For example, the disclosed methods of mixing oxygen and persulfate, either in the presence of phosphate or without phosphate present, may prompt the formation of one or more sulfate radicals. The disclosed methods of mixing ozone, oxygen, and persulfate, either in the presence of phosphate or without phosphate present, may prompt the formation of one or more sulfate radicals, hydroperoxide radicals, superoxide radicals, hydroxyl radicals, phosphate radicals, and/or phosphite radicals.

In some embodiments, a persulfate/phosphate mixture may be injected into water, ground water (saturated zone), smear zone or unsaturated zone via a first injector or injection well. A gas, such as oxygen gas alone or in combination with another gas (e.g., ozone), may be injected using the same injector or injection well where they may or may not be in contact with the other additives within the well. In some embodiments, a second injector may be used in the same region (or another region) as the first injector. Ozone may be formed on site by an in-situ or ex-situ ozone producing device(s) and in many cases may be mixed in oxygen or air to a level of from about 1% to 20% by volume. Ozone in oxygen or air may be sparged at rates that provide for a preferred radius of influence and in some cases the radius of influence may be at least as broad as that of a co-oxidant that may be introduced concurrently to the site. Feed rates may include, for example, 1-20 scfm per injection well. Together, the oxygen, ozone and/or persulfate (buffered with phosphate or unbuffered) may provide a combined radius of influence that provides greater destruction of compounds over a greater area than is realized using either compound independently, even when used independently at greater concentrations.

When treating ex-situ materials such as excavated soil, groundwater, waste water or process water, or concentrated wastes, methods of introducing reagents may be simplified and reagents such as oxidants and pH buffers may simply be added to the reactor at the desired time in the process. In some cases, the only reagents required are persulfate and oxygen and in other cases, the only reagents required are persulfate, oxygen and/or ozone and a source of phosphate ion. No other oxidants may be required. However, in addition to oxygen, persulfate, and/or phosphate, other compounds may also be used to improve destruction rates of co-contaminants in the ex-situ samples. For example, other oxidants, such as peroxides (e.g., hydrogen peroxide) and/or ozone may also be used in conjunction with oxygen, persulfate and/or phosphate, in some embodiments. In these and other embodiments, oligosaccharides (e.g., cyclodextrin) may also be used to improve destruction rates. Examples of suitable oligosaccharides are described in U.S. Pat. No. 8,049,056 that is herein incorporated by reference in its entirety. Destruction or aerosol formation rates may also be aided by raising the temperature of the reaction site. For instance, the temperature may be raised to greater than 50° C., greater than 70° C., or greater than 90° C. Destruction rates may also be aided by raising the pressure of the reaction site. For instance, the pressure may be raised to greater than 1 atmosphere, greater than 2 atmospheres, or greater than 3 atmospheres.

In some embodiments, hydrogen peroxide may be introduced to generate heat and/or to increase the water temperature. If present, hydrogen peroxide may also increase bubble formation and bubble rise velocity to control the rate of foam and/or aerosol formation relative to the rate of chemical oxidation of the PFAAs in the water. In some embodiments, hydrogen peroxide may be introduced at molar ratios within the range of 1:10,000 to 1:100 of hydrogen peroxide to persulfate.

In various embodiments, reagents may be introduced into soil or ground water using a well that may be vertically, horizontally or otherwise oriented. Wells, if present, may be temporary, semi-permanent or permanent. A well may include one or more conduits for transporting reagents from above-ground supplies to the target site, such as the saturated layer or the smear layer. Conduits for different reagents may be coaxial with each other or may run through distinct conduits in the well. A second reagent may be introduced through a different well than the first and may deliver the reagent at a different depth than the first. However, the second well may be positioned so that the radius of influence of the second compound substantially overlaps the radius of influence of the first compound. For example, with vertically installed wells, the vertical axis of the second well may close to the vertical axis of the first well. In some embodiments the two wells may be within 20', 15', 10', 5' or 2' of each other.

In embodiments where persulfate and phosphate are each used, these compounds may be used at approximately equal molar ratios or different molar ratios, such as for example the molar ratio of persulfate to phosphate may be 60:1, 30:1, 10:1, 5:1, 1:2 or 1:5. The molar ratio of phosphate to oxygen, in embodiments where each compound is used, may be approximately equal or may be different, such as for example the molar ratio of phosphate to oxygen may be 600:1, 300:1, 100:1, 50:1, 10:1, 5:1 or 3:1. In embodiments where persulfate and oxygen are used, these compounds may be present at approximately equal molar ratios or may be present at different molar ratios, such as for example the molar ratio of persulfate to oxygen may be 3000:1, 2000:1, 1000:1, 500:1, 100:1, 50:1 or 10:1. In embodiments where hydrogen peroxide is used, the molar ratio of persulfate to peroxide may be, for example, 1:1, 1:10, 1:5, 1:2, 2:1, 5:1, 10:1, 50:1, 100:1 or 1000:1.

In embodiments where ozone is used in the solution, the molar ratio of dissolved ozone to persulfate may be, for example, less than 1000:1, between 1000:1 and 10:1 or greater than 10:1. In these and other embodiments, the gas bubble size may be less than one nanometer, less than 5 nanometers, less than 10 nanometers, less than 50 nanometers, less than 100 nanometers, less than 1 micron, less than 10 microns, or less than 50 microns. In these and other embodiments, the gas flow rate of the ozone-containing gas may be at least 0.05 cfh, at least 0.5 cfh, at least 5 cfh, or at least 10 cfh per liter liquid volume.

The reagents may be supplied at any effective concentration that may be determined, in part, from the type of soil, type of contaminant, concentration of contaminant, and the vehicle used to transport the reagent. In some embodiments, persulfate (i.e., S2O7) may be used at a concentration of from 100 mg/L to 200 g/L; phosphate (i.e., PO4) may be used at a concentration of from 100 mg/l to 20 g/l; and soluble oxygen may be used at a concentration range of from 0.1 mg/L to 200 mg/L. In some select embodiments, ozone gas may be sparged in oxygen or air over a molar concentration range in the gas of about 1-20%. In these and other embodiments, hydrogen peroxide may be used at a concentration of from 100 mg/l to 200 g/l.

The reagents used, for example oxygen, persulfate and/or phosphate may be introduced to the target site simultaneously or sequentially. When introduced sequentially, the time between sequential injections should not be so great that the activity of the first-injected reagent has been significantly reduced before contacted with the second reagent. Reagents may be injected into different soil zones to provide for more complete destruction of contaminants.

With remediation systems that utilize sparging with either air or other gases in the saturated zone, there is the potential to volatilize the more volatile organics into the unsaturated zone before they can be oxidized. In addition, when adding oxidants to the saturated zone that generate heat during reaction, volatile organics can be driven from the saturated zone into the smear zone and/or unsaturated zone. The system described herein can trap and destroy those volatile organics.

In some embodiments, the saturated zone, smear zone, or unsaturated zone may be pre-oxidized with an oxidant prior to applying an oxidant for the purpose of destroying contaminants. This step may help to improve the completeness of chemical destruction in the later steps. The pH of an oxidant solution may be controlled to enhance, for example, stability and/or reactivity. In some embodiments a preferred pH range is 2.0-12.0. The pH of the solution may be controlled using a buffer, such as a phosphate. Once a target soil is chosen, an optimal pH for various oxidant solutions can be determined in the field or lab by those of skill in the art.

In addition to the desire to have longer lived reactive species to promote greater radial influence from the point of injection, there is also a desire to reduce the number of injection events required to achieve cleanup standards. Typically, using known techniques, two or more injection events are required to achieve the required reduction in contaminant concentration to meet the target clean-up goals. There are at least two reasons for this: 1) contaminants trapped in the "smear zone" are not targeted by existing ISCO technology, and 2) contaminants and oxidants are slow to diffuse into and out of micro-pores within the saturated zone, especially in fine grained soils. The system described herein can address these issues as well as others.

In some embodiments, in-situ aquifer flushing is disclosed in which water containing cyclodextrin, or another cyclic oligosaccharide, is injected to subsurface soil and/or groundwater to enhance PFAS removal from the soil and groundwater as it passes through the soil matrix to a hydraulically downgradient groundwater extraction well where groundwater containing a cyclodextrin-PFAS complex is extracted and removed using the described gas infusion technology or by other suitable methods. In some embodiments, the cyclic oligosaccharide is a beta-cyclodextrin or another derivative, such as hydroxyl-propyl beta cyclodextrin. The cyclodextrin or other type of oligosaccharide may be added to water in concentrations ranging from 0.001% to 10% when used in aquifer flushing to capture and remove PFAS from the subsurface. While not wishing to be bound by theory, it is believed that in some cases, the cyclic oligosaccharide may encapsulate or otherwise associate with the PFAS compounds in the soil and/or groundwater, thereby facilitating removal.

EXAMPLES

Various experiments were performed to support the concepts discussed here. The experimental procedures and results are presented in this section. PFAS concentrations were analyzed by modified EPA Method 537. Fluoride concentration was analyzed by EPA Method 340.2 that uses a low level selective ion electrode.

Example 1

In this example, the experiment had three sequential phases where the degradation of PFAS (i.e. PFOS and PFOA) was evaluated. The experiment was performed in a plastic column reactor with a sparger at the bottom using steam distilled water only containing 3 ug/l fluoride as a background concentration. In Phase I, PFAS degradation was measured using oxygenated distilled water. In Phase II, oxygenated persulfate was used, and in Phase III oxygenated buffered persulfate (OBP) with a solution pH of approximately pH 9 was used.

Procedure

A plastic reactor having a volume of approximately 4 liters and approximate dimensions of 16 inches height and 12 inches width was thoroughly cleaned and filled with the steam distilled water and spiked with 200 micrograms (ug)/liter of PFOS. Prior to testing, fluoride sorption to the plastic reactor was evaluated by analyzing a PFAS and fluoride spiked solution in the reactor during 2.5 hours of stirring. The results showed that approximately 750 ug/liter concentration of fluoride in tap water was constant over 2.5 hours. Leaching or sorption of fluoride to the plastic reactor was not detected as the fluoride concentration remained constant.

During Phase I of the experiment, the potential for volatilization or sorption of PFAS to or from the reactor was evaluated by collecting and analyzing samples for PFAS and fluoride analysis after 60 minutes of sparging pure oxygen into the reactor at 10 SCFH (standard cubic feet per hour).

During Phase II of the experiment, oxygenated persulfate was evaluated by adding 60 grams per liter persulfate to the reactor and sparging pure oxygen at 10 SCFH. After 1 hour of sparging, the oxygen introduction was terminated and samples were collected and analyzed. Thereafter, sodium hydrogen phosphate buffer was added and mixed with a magnetic stirrer until dissolved to yield a concentration of 8.6 grams/liter.

During Phase III, oxygenated buffered persulfate was tested. While sparging the fluid in the reactor with oxygen at approximately 10 SCFH, samples were collect at t=10 minutes, t=30 minutes and t=60 minutes. At t=60 minutes, the oxygen supply was terminated and the solution was continuously stirred until t=90 minutes, when a sample was collected.

Experimental results are shown in Tables 1.1 and 1.2 provided below.

TABLE 1.1

Fluoride concentration in tap water in the plastic reactor over time

| | Units | TAP WATER | 10 min | 30 min | 60 min | 150 min |
|---|---|---|---|---|---|---|
| Fluoride (F) | mg/L | 0.74 | 0.74 | 0.75 | 0.76 | 0.74 |

TABLE 1.2

PFOS and PFOA Concentrations during the Phases of Sequential Testing

| | Phase I-Spiked, oxygenated distilled water | | | | Phase II-oxygenated persulfate | | |
|---|---|---|---|---|---|---|---|
| | Spike conc. | Initial Conc. | After 1 hr. | After 2 hrs. | After 17 hrs. | Initial conc. | After 1 hour | % removal |
| PFOA | 200 | 225 | 220 | 220 | 220 | 220 | 180 | 18% |
| PFOS | 200 | 205 | 210 | 220 | 180 | 180 | 43 | 76% |

| | Phase III Oxygenated buffered persulfate | | | | |
|---|---|---|---|---|---|
| | Initial conc. | After 10 min | After 30 min | After 60 min | After 90 min | % removal |
| PFOA | 180 | 120 | 73 | 51 | 37 | 79% |
| PFOS | 43 | 29 | 17 | 13 | 14 | 67% |

As shown in Table 1.2, there was no appreciable change in PFOS or PFOA concentration observed during Phase I testing with oxygenated distilled water. Accordingly, spiked PFOS and PFOA were not observed to sorb or volatilize to or from the plastic reactor. However, some decrease was observed in both PFOS and PFOA during Phase II testing using oxygenated persulfate. A greater decrease was observed in Phase III testing using oxygenated buffered persulfate. As such, oxygenated persulfate alone is shown to facilitate removal or destruction of PFAS.

The following conclusions are drawn from the experimental results:

PFOS and PFOA did not significantly sorb to or volatilize from the plastic reactor.

Fluoride concentration was conserved in the plastic reactor.

PFOS and PFOA were removed from solution by oxygenated persulfate, and oxygenated buffered persulfate.

Example 2

In this example, testing was performed in a taller plastic column reactor than in example 1. The reactor had a sparger at the bottom and used steam distilled water that was spiked with PFAS (i.e. PFOS and PFOA) and then treated with sparged ozone (6%) and oxygen (94%), and buffered persulfate with a solution pH of approximately pH 9.0.

Procedure

The plastic column reactor used in this test was 5 feet in length with an inner diameter of 2.75 inches. The reactor was thoroughly cleaned, filled with 2.7 liters of the steam distilled water, and then spiked with PFOS and PFOA each at 500 ug/liter.

Fluoride concentrations were measured in the distilled water before and after PFAS spiking, after 1 hour of oxygenation to mix the spiking solution, after buffered persulfate was added at the same concentrations as in Example 1, and at various intervals during sparging with ozone and oxygen. Based on the amount of PFAS measured prior to sparging with ozone, the theoretical organofluorine contained in the PFAS was 590 ug/l.

Figure 2:
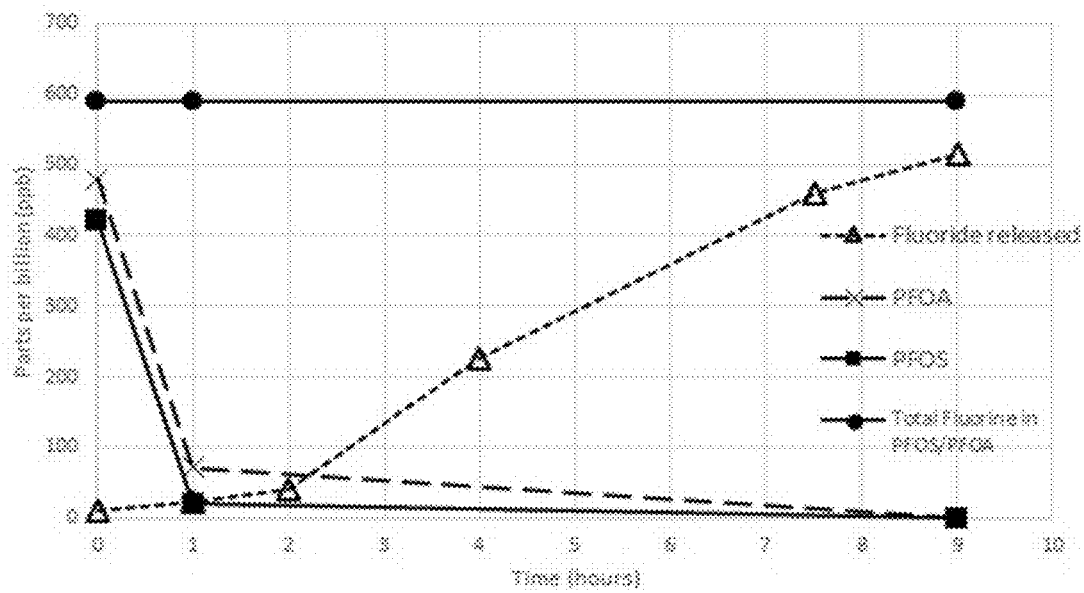
FIG. 2 shows the experimental results of Example 2 in which a solution containing PFAS was treated with various agents and the concentration of the PFAS was measured over time.

The fate of PFAS and fluoride in the reactor was evaluated by collecting and analyzing samples for PFAS and fluoride analysis during 9 hours of sparging ozone and oxygen into the buffered persulfate within the reactor at 5 SCFH (standard cubic feet per hour). The experimental results are shown in FIG. 2.

Only a small amount of background fluoride concentration was detected in the distilled water at 3 ug/l, the PFOS and PFOA spikes at 4 ug/l, and buffered persulfate at 3 ug/. However, fluoride concentrations slowly increased during ozonation as PFOS and PFOA were degraded to fluoride ion until, after 9 hours of ozonation, 86% of the fluoride contained in the PFAS had been broken down and released. After 1 hour of buffered persulfate solution ozonation, 90% of the PFOS and PFOA had been removed. After 9 hours, this removal rate had increased to 99.9%.

The following conclusions were drawn:

Fluoride did not sorb or leach to or from the plastic column reactor.

PFOS and PFOA did not sorb to the plastic column reactor.

86% de-fluorination of known PFAS occurred within the 9 hours of testing.

99.9% PFOS and PFOA were removed during sparging buffered persulfate with ozone (6%) and oxygen (94%)

Example 3

In this example, a sample of groundwater collected from an actual site where AFFF was released to the subsurface containing 167 ug/l of known PFAS compounds was tested initially using oxygenated buffered persulfate and then ozonated buffered persulfate testing over a 10.5 hour period. The 167 ug/l of PFAS in the groundwater consisted of 13 individual PFAS compounds with the majority as PFOS at 120 ug/l. The theoretical organofluorine concentration in the total PFAS was 110 ug/l.

Procedure

The plastic column reactor with a sparger at the bottom was thoroughly cleaned before a liter of steam distilled water containing approximately 3 ug/l fluoride was added to the reactor. After being in the reactor overnight, the distilled water in the reactor was tested and found to contain approximately 4 ug l fluoride background concentration.

Then, 2.6 liters of the AFFF contaminated groundwater then was poured into the plastic column reactor and sampled for fluoride before sparging oxygen into the reactor contents at 5 CFH to check for stabilization of fluoride. An off-gas water trap was fitted to the reactor for the collection of any PFAS or fluoride in the off-gas during testing for subsequent analyses. The trap was filled with 200 ml of distilled water. Persulfate and phosphate buffer were added to the reactor contents to produce the same concentrations as in the previous experiments with a solution pH of approximately pH 9.0. Oxygen was sparged at 5 SCFH for 1 hour but at this flowrate, foam formed and rose up the column and into the exhaust trap. Therefore, the flowrate was reduced to 0.5-1 SCFH to minimize foaming.

After this hour of testing with oxygenated buffered persulfate, the reactor contents were ozonated by sparging ozone (6%) and oxygen (94%) into the reactor at a flowrate of 1-5 SCFH for a period of 9.5 hours. During the entire 10.5 hour testing period, samples were periodically collected and analyzed for fluoride and PFAS. Also, the contents of the off-gas water trap was periodically collected for analysis and refilled with fresh distilled water.

During the one hour of oxygenated buffered persulfate testing, samples were not analyzed for PFAS. However, during the subsequent 9.5 hours, samples were analyzed and most PFAS decreased significantly and PFOS (the predominant contaminant) decreased 99% while the sum of all PFAS compounds decreased 70%. The experimental results for example #3 are presented in Table 3 below.

PFAS was also detected in the off-gas water trap indicating that PFAS was transferred from the liquid phase via aerosols and/or foam to the trap. Not all the consecutive off-gas water traps were analyzed for PFAS so the total amount of PFAS transferred is not known. However, the two traps that were analyzed (2 to 3.5 hrs. and 3.5 to 5.5 hours) demonstrated that at least 37 ug of PFAS, which was mostly as PFOS, was transferred. This is approximately 4% of the PFAS that was in the reactor at time zero.

During the one hour of oxygenated buffered persulfate, fluoride concentrations in the reactor did not increase, in fact, they decreased via transfer of fluoride to the off-gas trap. However, once ozonation began, fluoride concentrations in the reactor began to increase rapidly from approximately 13 ug/l to 831 ug/l after 9.5 hours of ozonation.

Significant amounts of fluoride (96 ug) were transferred via aerosols and/or foam to the exhaust water trap during the hour of buffered persulfate oxygenation. So much fluoride was transferred to the exhaust water trap that the fluoride concentration in reactor actually decreased. Smaller amounts of fluoride (15 ug) continued to be transferred from the reactor to the exhaust during the 9.5 hours of ozonation, presumably via aerosols since foaming was not observed entering the exhaust water trap during the ozonation phase.

TABLE 3

PFAS Treatment results for Example #3

| Parameters | Units | t = 0 | 2 hours | 3.5 hrs. | 5.5 hrs. | 7.5 hrs. | 10.5 hrs. |
|---|---|---|---|---|---|---|---|
| PFAS not Treated below Detection Limits in Reactor | | | | | | | |
| Perfluorobutane Sulfonate (PFBS) | ug/L | 0.38 | 3.0 | 3.1 | 3.3 | 2.9 | 2.4 |
| Perfluoroheptane sulfonate | ug/L | 2.3 | 1.8 | 1.2 | 0.61 | 1.1 | 0.45 |
| Perfluoroheptanoic Acid (PFHpA) | ug/L | 0.47 | 4.4 | 8.5 | 11 | 14 | 6.2 |
| Perfluorohexane Sulfonate (PFHxS) | ug/L | 13 | 24 | 26 | 18 | 18 | 5.0 |
| Perfluorohexanoic Acid (PFHxA) | ug/L | 2.3 | 26 | 30 | 32 | 32 | 25 |
| Perfluoro-n-Octanoic Acid (PFOA) | ug/L | 2.1 | 5.9 | 6.1 | 4.2 | 4.7 | 1.6 |
| Perfluorononanoic Acid (PFNA) | ug/L | 0.79 | 0.62 | 0.62 | 0.34 | 1.0 | 0.21 |
| Perfluorooctane Sulfonate (PFOS) | ug/L | 120 | 40 | 26 | 6.5 | 16 | 1.8 |
| Perfluoropentanoic Acid (PFPeA) | ug/L | 1.3 | 4.8 | 5.8 | 6.1 | 6.4 | 7.1 |
| PFAS treated to below Detection Limit levels in Reactor | | | | | | | |
| Perfluorodecane Sulfonate | ug/L | 0.24 | <0.22 | <0.22 | <0.22 | <0.22 | <0.22 |
| Perfluorodecanoic Acid (PFDA) | ug/L | 0.22 | <0.20 | <0.20 | <0.20 | <0.20 | <0.20 |
| 6:2 Fluorotelomer sulfonate | ug/L | 16.5 | 20 | 8.5 | 0.67 | <0.21 | <0.21 |
| 8:2 Fluorotelomer sulfonate | ug/L | 5.3 | 0.92 | <0.28 | <0.28 | <0.28 | <0.28 |
| Perfluorobutanoic acid | ug/L | 0.40 | <200 | <200 | <200 | <200 | <200 |
| Perfluoroundecanoic Acid (PFUnA) | ug/L | 2.5 | 0.185 | <0.14 | <0.14 | 0.17 | <0.14 |
| Sum of detected PFAS (concentration) | ug/l | 168 | 132 | 116 | 83 | 96 | 50 |
| Total concentration decrease in Reactor | % | — | 22% | 31% | 51% | 43% | 70% |

In total, the 2,050 ug of fluoride that was released from the PFAS as measured in the reactor (1,939) or traps (111 ug) were approximately seven times the amount of organofluorine contained in the known mass of PFAS (107 ug) at time zero. This indicates that there were other organofluorine compounds in the groundwater sample that were not being analyzed by the current PFAS analytical method of EPA Method 537. This is consistent with the literature showing that AFFF is known to contain many dozens of fluorinated compounds that are not yet able to be analyzed because no standards exist. Therefore much of this unidentified PFAS must have been de-fluorinated by both the oxygenated and ozonated buffered persulfate.

The following conclusions are drawn from the experiment results:

Both oxygenated and ozonated buffered persulfate remove PFAS from the reactor by both chemical destruction/defluorination and physical transfer as an aerosol and/or foam to the off-gas water trap.

Overall removal of identifiable PFAS after a total of 10.5 hours of oxygenated and ozonated buffered persulfate treatment was 70%.

Table 4 below presents the concentration of the measured PFAS in the reactor during the 19 hours of treatment with a mixture of oxygen, ozone, and buffered persulfate. The concentration of the sixteen detected PFAS in the groundwater decreased significantly in the two hours of oxygenated buffered persulfate, from 90-99+% depending on the specific compound, averaging 99% overall. The majority of this PFAS reduction was due to transfer from the reactor to the off-gas trap as aerosols or foam, considering that the total amount of fluoride in the system (i.e. contained in the reactor plus trap) did not change.

TABLE 4

PFAS Treatment Results for Example #4

| Parameters/Sample Name | Units | Start | 2 hours | 5 hours | 8 hours | 11 hours | 19 hours |
|---|---|---|---|---|---|---|---|
| PFAS not Treated below Detection Limits in Reactor | | | | | | | |
| Perfluorobutane Sulfonate (PFBS) | ug/L | 0.29 | 0.0048 | 2.2 | 2.0 | 1.5 | 2.8 |
| Perfluoroheptane sulfonate | ug/L | 5.4 | 0.027 | 0.073 | 0.018 | <0.009 | 0.32 |
| Perfluoroheptanoic Acid (PFHpA) | ug/L | 0.40 | <0.012 | 1.3 | 0.93 | 0.074 | 8.1 |
| Perfluorohexane Sulfonate (PFHxS) | ug/L | 17 | 0.081 | 3.9 | 1.6 | 0.052 | 13 |
| Perfluorohexanoic Acid (PFHxA) | ug/L | 1.7 | 0.017 | 5.3 | 5.2 | 2.8 | 17.0 |
| Perfluorooctanoic Acid (PFOA) | ug/L | 2.8 | 0.023 | 0.12 | 0.053 | 0.013 | 0.50 |
| Perfluorooctane Sulfonate (PFOS) | ug/L | 320 | 3.0 | 0.68 | 0.16 | 0.071 | 3.2 |
| Perfluoropentanoic Acid (PFPeA) | ug/L | 0.76 | 0.073 | 1.8 | 2.5 | 2.5 | 3.6 |
| PFAS treated to below Detection Limits in Reactor | | | | | | | |
| Perfluorodecane Sulfonate | ug/L | 0.53 | 0.011 | <0.011 | <0.011 | <0.011 | <0.22 |
| Perfluorodecanoic Acid (PFDA) | ug/L | 0.45 | <0.017 | <0.017 | <0.017 | <0.017 | <0.20 |
| 6:2 Fluorotelomer sulfonate | ug/L | 12 | 0.090 | 0.53 | 0.044 | <0.016 | <0.21 |
| 8:2 Fluorotelomer sulfonate | ug/L | 12 | 0.16 | 0.039 | 0.014 | <0.014 | <0.28 |
| Perfluorobutanoic acid | ug/L | 0.30 | 0.0066 | <0.007 | <0.007 | <0.007 | <2.0 |
| Perfluorononanoic Acid (PFNA) | ug/L | 0.75 | 0.017 | 0.039 | 0.026 | 0.014 | <0.19 |
| Perfluoroundecanoic Acid (PFUnA) | ug/L | 5.6 | 0.066 | 0.025 | 0.023 | <0.009 | <0.14 |
| Sum of detected PFAS (concentration) | ug/l | 380 | 3.6 | 16 | 13 | 7.0 | 49 |
| Total concentration decrease in Reactor | % | — | 99.1% | 95.8% | 96.7% | 98.2% | 87.2% |

The large amount of fluoride released during the test indicated that there was a large amount of other PFAS compounds in the AFFF contaminated groundwater than those detected.

Example 4

In another example, groundwater contaminated with AFFF contained 380 ug/l of known PFAS compounds underwent both oxygenated buffered persulfate and ozonated buffered persulfate testing over a 19 hour period. Fifteen individual PFAS, primarily PFOS at 320 ug/l, were detected in the sample.

The same plastic column reactor used in example 3 was re-used after thoroughly cleaning and testing that the column neither sorbed nor leached fluoride. Sodium persulfate and phosphate buffer were dissolved into 5 liters of the contaminated groundwater at the same concentrations as in previous experiments.

Oxygen was sparged into the bottom of the reactor with a diffuser at a flowrate varying from 2 to 5 CFH for 2 hours with the exhaust passing through the off-gas water trap whose contents were collected and replaced periodically with new distilled water. After this phase, ozone and oxygen were sparged for 17 more hours. Samples from the reactor and of the trap contents were periodically measured for fluoride and PFAS.

During the full 19 hours of testing, seven of the individual PFAS continued to decrease in concentration to below detection limits, reaching a 99.8% removal rate. During the ozonation phase, especially between hours nine and sixteen, 8 individual PFAS compounds increased in concentration (such that the overall reduction in PFAS concentration was only 87%). While this increase may have been due to analytical variations at such low concentrations, it appears that the treatment was converting some detectable PFAS into other detectable PFAS compounds. PFOS is one such compound that decreased from 320 ppb initially to 0.07 ppb (the new EPA Drinking Water Health Advisory level) in nine hours but then increased to 3.2 ppb at sixteen hours. Regardless, the overall removal of PFOS was 99%.

PFAS analyzed in three of the exhaust water trap contents showed that most of the PFAS that were removed by the sparging exhaust occurred in the first hour via aerosols and/or foam. Smaller amounts PFAS were also transferred via the exhaust during the second hour of oxygenation and during the third to nine hours of ozonation, presumably via aerosols (since foam was not observed being transferred). Not all the consecutive exhaust water traps were analyzed for PFAS so the total amount of PFAS transferred was not known. However, the three traps that were analyzed demonstrated that at least 81 ug of PFAS (mostly PFOS) were transferred. This is approximately 4% of the PFAS that were in the reactor at time zero.

Fluoride concentration increased in the reactor during the 19 hours of testing, indicating defluorination and release of the organofluorine by the PFAS. Some of this released fluoride was transferred from the reactor to the off-gas trap via aerosols and/or foam during the first hour of oxygenation. Smaller amounts of released fluoride continued to be transferred from the reactor to the off-gas during the subsequent 18 hours most likely via aerosols. The total amount of fluoride released and found in the reactor (397 ug) and the off-gas water trap (116 ug) was 513 ug or about 42% of the organofluorine contained in the detected PFAS at time zero (1230 ug).

The following conclusions are drawn from the experiment results:

Both oxygenated and ozonated buffered persulfate were shown to remove PFAS from the reactor by both chemical destruction/defluorination and physical transfer as an aerosol and/or foam to the off-gas water trap.

Overall removal of identifiable PFAS after 19 hours of oxygenation and ozonation treatment was 87% while many individual PFAS were removed to below detection limits.

42% of the organofluorine in the detected PFAS were de-fluorinated and released during the test.

the testing, as in some of the previously described experiments, contained a background concentration of 3-4 ug/l of fluoride.

To create the test solution, PFOS and PFOA were spiked into 2.3 liters of distilled water, followed by phosphate buffer and persulfate addition at the same concentrations as in previous experiments, to produce a test solution with a pH between pH 9 and pH 10.

This test solution was analyzed for PFAS, pH, and fluoride and transferred to the column reactor where pure oxygen was sparged into the solution at various flowrates and pressures. The fluoride concentration was analyzed as explained previously to assess de-fluorination of the PFAS compounds. At various intervals during the 48 hour experiment, samples were collected from the column and off-gas trap for PFAS analysis.

Figure 3:
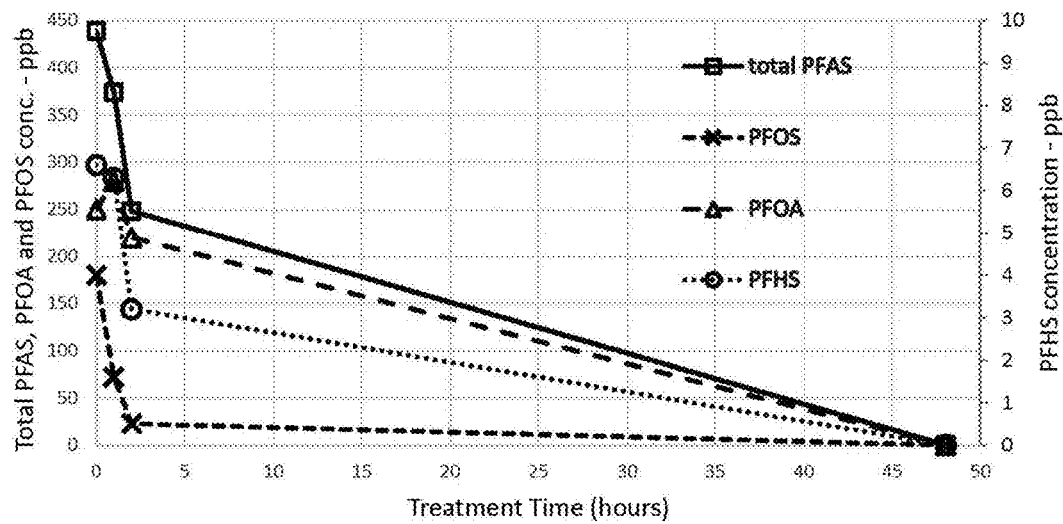
FIG. 3 shows the experimental results of Example 5 in which oxygenated buffered persulfate was used to treat a solution containing PFAS, in accordance with some example embodiments, and the concentration of the PFAS was measured over time.

FIG. 3 and Table 5 present the resulting measured concentration of PFAS over time. The PFAS consists of PFOS and PFOA plus small concentrations of six other PFAS believed to be minor contaminants contained within the purchased PFOS and PFOA chemicals. Only one PFAS, perfluoroheptanesulfonate, was detected greater than 1 ug/l.

TABLE 5

PFAS Experimental Data from Column Reactor

| PFAS | 0 hours | 1 hour | 2 hours | 48 hours | % removal |
|---|---|---|---|---|---|
| | Concentration of PFAS (micrograms/liter = ppb) | | | | |
| 5:2 Fluorotelomer sulfonate | 0.25 | <2.1 | <0.21 | <0.016 | 96.8% |
| Perfluorobutane Sulfonate (PFBS) | 0.32 | <2.3 | 0.30 | 0.0091 | 97.2% |
| Perfluorobutanoic acid | <200 | 12 | <200 | 0.10 | 99.9% |
| Perfluoroheptane sulfonate | 6.6 | 6.3 | 3.2 | 0.010 | 99.8% |
| Perfluoroheptanoic Acid (PFHpA) | 0.55 | <2.7 | 0.51 | <0.012 | 98.9% |
| Perfluorohexane Sulfonate (PFHxS) | 0.78 | 1.7 | 0.75 | <0.010 | 99.4% |
| Perfluorohexanoic Acid (PFHxA) | 0.41 | <1.7 | 0.42 | 0.016 | 96.1% |
| Perfluoro-n-Octanoic Acid (PFOA) | 250 | 280 | 220 | 0.19 | 99.9% |
| Perfluorooctane Sulfonate (PFOS) | 180 | 72 | 23 | 0.11 | 99.9% |
| Perfluoropentanoic Acid (PFPeA) | <0.21 | <2.1 | <0.21 | 0.11 | NC |
| Perfluorotetradecanoic Acid | <0.20 | 2.2 | <0.20 | <0.013 | NC |
| Perfluoroundecanoic Acid (PFUnA) | 0.15 | <1.4 | <0.14 | <0.0093 | 99.7% |
| TOTAL PFAS (ppb) | 439 | 374 | 248 | 0.55 | 99.9% |

NC: Not Calculated (due to no detection in original sample)

Example 5

This experiment was conducted in steam distilled water spiked with PFAS to evaluate the removal, degradation and de-fluorination of PFOS and PFOA during treatment with oxygenated buffered persulfate. The experiment was specifically designed to evaluate the integrated mechanisms of 1) chemical degradation by oxidation and/or reduction of PFAS; and 2) transfer of PFAS from buffered persulfate as an aerosol or foam by sparging pure oxygen gas into phosphate buffered persulfate water containing PFOS and PFOA. The solution pH was approximately pH 9.0.

Procedure

The experiment was conducted in a plastic column reactor with a sparger at the bottom of the reactor that was filled with steam distilled water. Pure oxygen was sparged into the solution at the bottom of the reactor. The off-gas from the column reactor was passed through an off-gas trap to catch any aerosols or foam and ultimately vented to the ambient atmosphere.

The plastic column reactor and the off-gas trap were tested prior to the experiment to confirm that they did not sorb or desorb fluoride, PFOS, or PFOA. The distilled water used in As shown in FIG. 3 and Table 5, the concentration of total detected PFAS in the column reactor decreased by 99.9% within 48 hours, from 439 ppb to >0.6 ppb. The two added compounds, PFOS and PFOA, had an initial concentration of 180 and 250 ppb, respectively, which decreased by 99.9% to 0.11 and 0.19 ppb, respectively, during the same time period. These concentrations are less than the 2009 EPA Provisional Health Advisory Guidelines of 0.2 and 0.4 ppb, respectively, for PFOS and PFOA. The rate of PFAS concentration decrease in the reactor was most significant in the beginning of the test.

The initial PFAS mass in the water contained in the column reactor was 1,010 micrograms but after the 48 hours of testing and 99.9% removal, only 1 microgram of PFAS remained.

Approximately 26% of the initial 1,010 micrograms of PFAS in the column reactor (i.e. 260 micrograms) was transferred with the off-gas from the column reactor to the off-gas water trap. Very little PFAS (0.6 micrograms) were transferred in the first hour, 18 micrograms (2% of the total) in the second hour, with the majority (241 micrograms) of the PFAS transferred between 2 to 48 hours.

The fluoride concentration in the column reactor gradually increased from the initial time zero (i.e., before oxygenation) concentration of 17 ug/l to 52 ug/l after 48 hours. The rate of PFAS de-fluorination resulting in the release of fluoride decreased during the 48 hour test, from 16 micrograms during the first hour, 8 micrograms during the second hour, 4 micrograms/hour for the next 7.5 hours and 1.6 micrograms/hour thereafter. This indicates that, in addition to the PFAS that was transferred from the column reactor to the off-gas trap, some of the PFAS in the reactor was de-fluorinated as indicated by an increase in fluoride anion concentration. Over the 48 hour testing period, the total amount of fluoride released in the column reactor water was 73 micrograms, or about 11% of the theoretical fluorine mass contained in the initial PFAS.

During the 48 hour test the fluoride concentration in each of the three off-gas trap samples also increased from the background concentration of 3 ug/l in the distilled water. The rate of fluoride released and/or transferred to the traps was highest at the beginning of the test with 0.3 microgram released during the first hour, 0.8 microgram released in the second hour, and less than 0.1 microgram released per hour from 2 to 48 hours. In total, 4.4 micrograms of fluoride was released into the three sequential off-gas traps. This is about 1% of all the fluoride contained in the PFAS at time zero. So in total, together with the 11% fluoride released in the column, about 12% of the organofluorine contained in the initial PFAS mass was de-fluorinated to fluoride.

Figure 4:
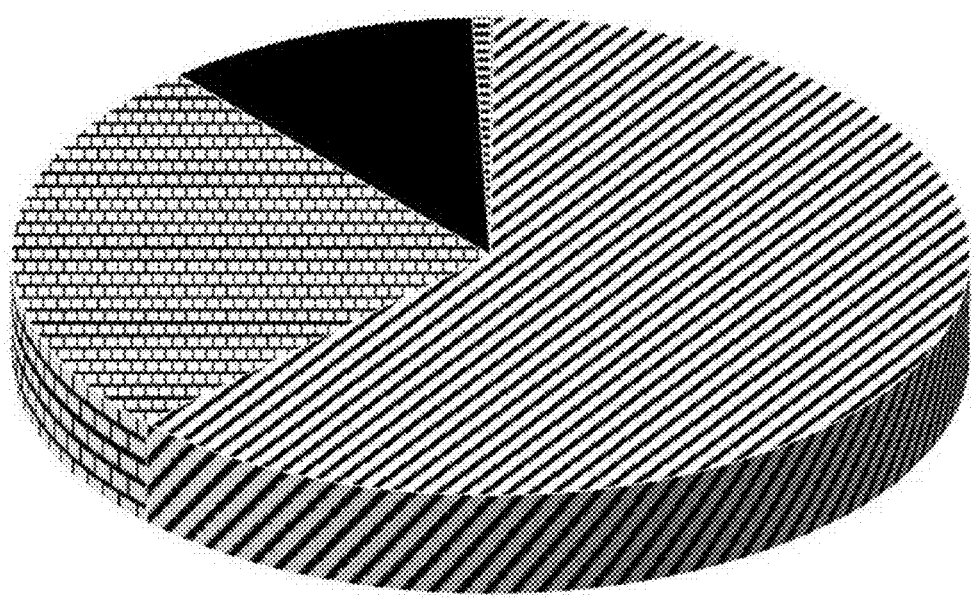
FIG. 4 is a pie chart showing the disposition of PFAS (approximated by fluorine measurements) in Example 5 after two days of treatment with oxygenated buffered persulfate.

Based on these PFAS and fluoride measurements throughout this 48-hour experiment, the following fluoride mass balance shown in FIG. 4 pie chart results shows the disposition of the initial PFAS during the experiment. The integrated PFAS removal mechanisms of chemical degradation and transfer from the liquid phase as shown in the pie chart indicates that:
1. 0.1% of the initial PFAS was still in the column reactor at the end of 48-hours
2. 26% of the initial PFAS was transferred to the off-gas water trap;
3. 10.7% of the fluorine in initial PFAS was de-fluorinated to fluoride anion and measured in the column reactor;
4. 0.6% of fluorine in the initial PFAS was mineralized to fluoride anion and measured in the off-gas trap;
5. After 48 hours, the remaining 63% of the PFAS remained in the column reactor or the off-gas traps as unidentifiable poly- or per-fluorinated PFAS, or as non-fluorinated breakdown products of PFAS.

The following conclusions are drawn from the experimental results:
1. The oxygenated phosphate buffered persulfate de-fluorinates PFAS and releases fluoride anion.
2. 26% of the PFAS was transferred from the water to the off-gas as aerosols or foam such that more than 99% of PFOS and PFOA were removed from the water in the column reactor.
3. A total of 12% of the organofluorine in PFAS was de-fluorinated to fluoride.

Definitions

"Persulfate" includes both monopersulfate and dipersulfate. Typically, persulfate is in the form of aqueous sodium, potassium or ammonium dipersulfate or sodium or potassium monopersulfate or a mixture thereof.

As used herein, "phosphate" includes both inorganic and organic forms. It can be supplied as a simple inorganic phosphate in the form of sodium or potassium dibasic phosphate, or as sodium or potassium monobasic phosphate, or sodium or potassium tribasicphosphate. The simple forms of phosphate are used as pH buffers. Phosphates can also be supplied as complex inorganic phosphate in the form of sodium tripolyphosphate, sodium-potassium tripolyphosphate, tetrasodium polyphosphate, sodium hexametaphosphate, and sodium trimetaphosphate. These phosphates can also be used as a phosphate source. In aqueous solution, the hydrolytic stability of the phosphate depends on the original phosphate compound. For example, linear polyphosphates undergo slow hydrolysis. This process continues as the shorter chain polyphosphates break down further to yield still shorter chain polyphosphates, metaphosphates, and orthophosphates. Generally, lower pH and higher temperature will increase the rate of hydrolysis. Long chain polyphosphates will break down into shorter, but still functional, polyphosphates. Sodium tripolyphosphate is a strong cleaning ingredient used in detergents to aid surfactants and act as a pH buffer.

Phosphate can also be supplied as phosphonate, which is an organic form of phosphate containing $C-PO(OH)_2$ or $C-PO(OR)_2$ groups (where R=alkyl, aryl). Phosphonates are known as effective chelating agents. The introduction of an amine group into the molecule to obtain $-NH2-C-PO(OH)_2$ increases the metal binding abilities of the phosphonate. Examples for such compounds are EDTMP and DTPMP. These common phosphonates are the structure analogues to the well-known aminopolycarboxylates NTA, EDTA, and DTPA. The stability of the metal complexes increases with increasing number of phosphonic acid groups. Phosphonates are highly water-soluble while the phosphonic acids are only sparingly soluble.

In addition, phosphate can also be supplied as a peroxodiphosphate or perphosphate, which is a peroxide form of phosphate. It is known to form radicals when activated and reacted with organic compounds similarly to persulfate. As the perphosphate radical reacts with organic compounds, it decomposes to perphosphate anions. The rate of reaction with organic compounds is usually much slower compared to persulfate.

When a phosphate will be added to any water that can be potentially used for drinking water, there are approved phosphate compounds that can be added. According to the National Sanitation Foundation, phosphate products for supply of phosphate in potable water conditions can be broadly classified as: phosphoric acid, orthophosphates, and condensed phosphates. These are listed here in detail:
1. Phosphoric Acids
2. Orthophosphates: Monosodium Phosphate (MSP), Disodium Phosphate (DSP), Trisodium Phosphate (TSP), Monosodium Phosphate (MKP), Dipotassium Phosphate (DKP), Tricalcium Phosphate (TCP)
3. Condensed Phosphates: Sodium Acid Pyrophosphate (SAPP), Sodium Trimetaphosphate (STMP), Tetrasodium Pyrophosphate (TSPP), Sodium Tripolyphosphate (STP) and Tetrapotassium Pyrophosphate (TKPP), Sodium Heaxametaphosphate (SHMP).

In addition to the use of phosphates for buffering, reaction enhancement, and radical formation in organic chemical reactions, phosphates also play an important role in soluble metal sequestration and they can form metal precipitates. Phosphate sequestration of metals is a chemical combination of a phosphate chelating agent and metal ions in which soluble complexes are formed. Sequestration is dependent upon pH and a given sequestrant typically works best within a certain pH range. Sodium hexmetaphosphates (SHMP) performs well at neutral pH ranges, while pyrophosphates and polyphosphates work best under alkaline conditions. Phosphate can be used to precipitate unwanted metals, such as lead, from aqueous solution. For example, phosphate forms a lead-phosphate precipitate at an optimal pH around pH 6.0. Phosphate can under certain conditions also react with native metals in a soil/water environment to render the metals non-reactive with any reagents introduced into this environment.

The simple phosphates used as pH buffers are added in concentration ranges from 1 gram per liter (g/l) to 15 g/l in a pH range from pH 4 to pH10. The complex phosphates can be supplied at 1 g/l to 15 g/l in a pH range from pH 4 to pH 10. Phosphate compounds can be added simultaneously or sequentially with the other reagents.

Phosphate compounds can be mixed with other liquid oxidants, such as sodium persulfate and hydrogen peroxide, and then injected to remediate contaminated soil and groundwater. Phosphate compounds can also be dissolved in water and injected by themselves, to bolster treatment zone pH, to activate oxidants, to complex and isolate metals found in the soil formation, and to act as a nutrient source for bioremediation purposes.

These phosphate compounds can be mixed with each other or the other oxidants. Phosphate radical (e.g. HPO4r−) is produced from unactivated phosphate species in the presence of ozone through a multi-step process. First, dissolved ozone reacts with hydroxyl anion in solution to form perhydroxyl anion (HO2−). Ozone then reacts with perhydroxyl anion to form superoxide radical and hydroxyl radical. Phosphates scavenge the hydroxyl radical to produce a phosphate radical species. This phosphate radical can then activate persulfate anion to form sulfate radical.

Example Persulfate activation pathway:

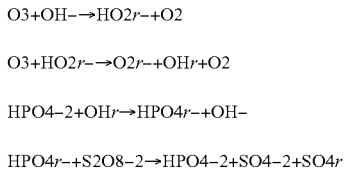

O3+OH−→HO2r−+O2

O3+HO2r−→O2r−+OHr+O2

HPO4−2+OHr→HPO4r−+OH−

HPO4r−+S2O8−2→HPO4−2+SO4−2+SO4r

There are known to be other phosphate species such as HPO3r− radical that can react similarly with persulfate anion to produce sulfate radical.

Several phosphate species, such as peroxydiphosphate (P2O8−4), will decompose to form phosphate radical species (i.e. PO4r−2). Using an oxidizing form of phosphate like this can avoid the initial activation mechanism involving hydroxyl radical scavenging in order to activate persulfate anion, while still providing buffering capacity after persulfate activation has occurred. Additionally, ozone can then be used to reactivate the spent phosphate for further persulfate anion activation.

Possible reaction pathway:

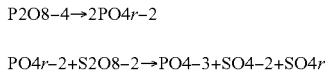

P2O8−4→2PO4r−2

PO4r−2+S2O8−2→PO4−3+SO4−2+SO4r

Which then continues like the persulfate activation pathway above.

"Oxygen" includes all forms of gaseous, liquid, and solid oxygen such as pure oxygen gas, air, hydrogen peroxide, and all other inorganic peroxides such as calcium or magnesium peroxide or organic peroxides, such as organic peroxides available from Luperox.

"Salt" includes sodium chloride and other species having both cationic or cationizable components and anionic or anionizable components.

"Oxidizing radicals" includes sulfate radical, hydroxyl radical, hydroperoxide, phosphate radical and others.

"Reducing radicals" includes superoxide.

"Saturated zone" refers to the region of the soil profile that is consistently below ground water level.

"Unsaturated zone" refers to the region of the soil profile that is consistently above ground water level.

"Smear zone" refers to the region of the soil profile through which the ground water level fluctuates, typically on a seasonal basis. The smear zone is the region that when the ground water is at its highest would be considered saturated and when the ground water is at its lowest would be considered unsaturated. It is also called the capillary zone.

"Organic contaminant" is an organic compound that is not native to the soil or water in which it is found. Organic compounds may include, for example, poly- and perfluoralkyl compounds (PFAAs), hydrocarbon-based fuels, halogenated and non-halogenated solvents, pesticides, herbicides, PCBs, volatile hydrocarbons, semi-volatile hydrocarbons, chlorinated volatile hydrocarbons, BTEX and MTBE.

"Area or Radius of influence" describes the area around a well or other injection point defining an area throughout which an adequate amount of reactant can be introduced to oxidize at least some of the organic contaminant present.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention. All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that 20 are conjunctively present in some cases and disjunctively present in other cases. All references, patents and patent applications and publications that are cited or referred to in this application are incorporated in their entirety herein by reference.

What is claimed is:

1. A method of removing poly and/or per fluorinated alkyl hydrocarbons from water, the method comprising:
    passing air, oxygen or nitrogen bubbles through an aqueous phase contaminated with a contaminant comprising polyfluorinated alkyl hydrocarbons and/or perfluorinated alkyl hydrocarbons;
    transferring the contaminant to a foam separate from the aqueous phase;
    separating the foam from the aqueous phase; and
    destroying at least a portion of the contaminant in the foam by oxidation.

2. The method of claim 1 comprising adding a salt to the aqueous phase.

3. The method of claim 1 comprising destroying at least a portion of the contaminant in the foam by adding at least two of persulfate, ozone, hydrogen peroxide, oxygen and salt.

4. The method of claim 3 comprising adding ozone and persulfate.

5. The method of claim 1 further comprising removing at least a portion of the contaminant from the foam.

6. The method of claim 5 wherein the portion of the contaminant removed from the foam is removed using at least one of solid phase extraction, liquid-liquid extraction, filtration, distillation or adsorption.

7. The method of claim 1 wherein greater than 20% of the contaminant is transferred from the aqueous phase to the foam.

8. The method of claim 1 comprising adding an oligosaccharide to the water.

9. The method of claim 1 wherein the foam comprises an oligosaccharide.

10. The method of claim 9 wherein the oligosaccharide comprises cyclodextrin.

11. The method of claim 1 wherein the pH of the aqueous phase is greater than 5.0.

12. The method of claim 1 wherein the pH of the aqueous phase is greater than 8.0.

* * * * *